United States Patent
Nicholls et al.

(10) Patent No.: US 10,396,885 B2
(45) Date of Patent: Aug. 27, 2019

(54) DYNAMIC PARTITIONING OF MODULAR PHASED ARRAY ARCHITECTURES FOR MULTIPLE USES

(71) Applicant: INTEL CORPORATION, Santa Clara, CA (US)

(72) Inventors: Richard B. Nicholls, Portland, OR (US); Alexander Maltsev, Nizhny Novgorod (RU); Carlos Cordeiro, Portland, OR (US); Ali S. Sadri, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/021,581

(22) PCT Filed: Dec. 20, 2013

(86) PCT No.: PCT/US2013/076983
§ 371 (c)(1),
(2) Date: Mar. 11, 2016

(87) PCT Pub. No.: WO2015/038178
PCT Pub. Date: Mar. 19, 2015

(65) Prior Publication Data
US 2016/0226570 A1 Aug. 4, 2016

Related U.S. Application Data

(60) Provisional application No. 61/876,656, filed on Sep. 11, 2013.

(51) Int. Cl.
*H04B 7/08* (2006.01)
*H01Q 1/24* (2006.01)
(Continued)

(52) U.S. Cl.
CPC .......... *H04B 7/0897* (2013.01); *H01Q 1/246* (2013.01); *H01Q 3/26* (2013.01); *H01Q 21/06* (2013.01);
(Continued)

(58) Field of Classification Search
CPC . H01Q 1/24; H01Q 3/26; H01Q 1/246; H04B 7/04; H04B 7/0417; H04B 7/06;
(Continued)

(56) References Cited

U.S. PATENT DOCUMENTS

| 6,864,837 | B2 | 3/2005 | Runyon et al. |
| 9,083,398 | B2 | 7/2015 | Dartois et al. |

(Continued)

FOREIGN PATENT DOCUMENTS

| CN | 101521522 | 9/2009 |
| CN | 102683897 | 9/2012 |

(Continued)

OTHER PUBLICATIONS

Madhow et al., "Revisiting MIMO for tiny wavelengths 60GHz and beyond", <www.ieee-ctw.org/2013/slides/mmWave_Panel.pdf>, 2016, 13 pages.

(Continued)

*Primary Examiner* — Shawkat M Ali (57) ABSTRACT

Various embodiments are generally directed to techniques to dynamically configure a modular antenna array (MAA) for multiple independent uses. An MAA may include a plurality of antenna modules, each of the antenna modules comprising an array of antenna elements coupled to a radio frequency (RF) beamforming circuit, the RF beamforming circuit to adjust phase shifts associated with the antenna elements to generate an antenna beam associated with the antenna module, a dynamic configuration unit to receive an indication of a usage for a one of the plurality of antenna
(Continued)

modules, and a main beamforming unit coupled to the dynamic configuration unit and each of the antenna modules, the main beamforming unit to generate signal adjustments relative to the one of the plurality of antenna modules to control the antenna beam associated with the one of the plurality of antenna modules based at least in part on the usage.

22 Claims, 6 Drawing Sheets

(51) Int. Cl.
    *H01Q 3/26*         (2006.01)
    *H01Q 21/06*       (2006.01)
    *H01Q 25/00*       (2006.01)
    *H04B 7/06*         (2006.01)
    *H04W 16/28*       (2009.01)

(52) U.S. Cl.
    CPC ........... *H01Q 25/00* (2013.01); *H04B 7/0619* (2013.01); *H04W 16/28* (2013.01)

(58) Field of Classification Search
    CPC ...... H04B 7/0619; H04B 7/08; H04B 7/0897; H04B 7/14; H04J 1/01; H04J 3/02; H04L 1/00; H04L 27/00; H04M 1/00; H04W 16/28
    USPC ........ 370/280, 281, 329; 375/259, 267, 295, 375/316, 340; 455/25, 522
    See application file for complete search history.

(56) References Cited

U.S. PATENT DOCUMENTS

| | | |
|---|---|---|
| 9,614,594 B2 | 4/2017 | Kim |
| 2002/0150065 A1* | 10/2002 | Ponnekanti .......... H04B 7/0617 370/334 |
| 2004/0242274 A1 | 12/2004 | Corbett et al. |
| 2006/0040615 A1* | 2/2006 | Mohamadi ........... H04B 7/0613 455/25 |
| 2006/0192711 A1 | 8/2006 | Haskell |
| 2012/0033761 A1* | 2/2012 | Guo ........................ G01S 3/023 375/316 |
| 2013/0028341 A1* | 1/2013 | Ayach .................. H04B 7/0478 375/267 |
| 2013/0121342 A1* | 5/2013 | Kim ..................... H04B 7/0408 370/436 |
| 2013/0148759 A1* | 6/2013 | Tee ...................... H04B 7/0695 375/296 |
| 2013/0202054 A1* | 8/2013 | Khan ....................... H01Q 3/26 375/259 |
| 2013/0300605 A1 | 11/2013 | Celentano et al. |
| 2013/0343444 A1* | 12/2013 | Greenberg ............... H01Q 3/26 375/226 |
| 2014/0056381 A1* | 2/2014 | Wang ................... H04B 7/0617 375/295 |

FOREIGN PATENT DOCUMENTS

| | | |
|---|---|---|
| JP | 2008301322 | 12/2008 |
| KR | 10-20080043592 | 5/2008 |

OTHER PUBLICATIONS

International Search Report and Written Opinion received for PCT Patent Application No. PCT/US2013/076983, dated Jun. 11, 2014, 10 pages.

Office action received for Korean patent Application No. 2016-7003313, dated Jan. 19, 2017, 10 pages.

\* cited by examiner

DYNAMIC PARTITIONING OF MODULAR PHASED ARRAY ARCHITECTURES FOR MULTIPLE USES

RELATED APPLICATIONS

This application claims the benefit of U.S. Provisional Application Ser. No. 61/876,656 filed Sep. 11, 2013, entitled "Dynamic Partitioning of Modular Phased Array Architectures for Scalable, Multiple-Usage Scenarios," which application is incorporated herein by reference in its entirety.

TECHNICAL FIELD

Embodiments described herein generally relate to modular antenna arrays and particularly to dynamically partitioning modular antenna arrays for multiple uses.

BACKGROUND

Electronic devices, such as laptops, notebooks, netbooks, personal digital assistants (PDAs) and mobile phones, for example, increasingly tend to include a variety of wireless communication capabilities operating at increased data rates. The wireless communication systems used by these devices are expanding into the higher frequency ranges of the communication spectrum, such as, for example, the millimeter wave region. As will be appreciated, propagation losses and attenuation tend to increase at these higher frequencies and it can become difficult to implement antenna systems in a manner that provides the desired gain and spatial coverage.

Communication in this band at distances beyond several meters typically requires the use of highly directional antennas with tens of dB of gains or more to compensate for the attenuation losses. Some communication systems employ phased array beamforming to generate a relatively narrow beam, which results in the necessary gain to overcome path-loss associated with transmission in these higher frequencies.

Modern communication systems, however, often also require a station to be capable of covering a relatively wide area around it to communicate with other stations regardless of their locations. Techniques for changing the antenna coverage pattern are referred to as beamsteering. In traditional antenna architectures, the requirement for a highly directional coverage pattern is at odds to the requirement for an electronically steerable beam. Conventionally, it is difficult and/or costly to achieve high directivity to overcome path loss while simultaneously providing a high degree of beamsteering coverage to multiple stations.

Therefore, a need exists for a more flexible and less expensive system and method to dynamically provide high directivity coverage to multiple stations.

DETAILED DESCRIPTION

Examples are generally directed to dynamically configurable modular antenna array (MAA) architectures. More specifically, various examples describe a MAA where the modules may by dynamically configured to generate antenna beams having various characteristics to provide increased beamforming and/or beamsteering capabilities to provide high directivity coverage for multiple stations. Said differently, various embodiments in accordance with the present disclosure provide a flexible and adaptive MAA, which can be configured in real time to service different users in different environments and different data rates. The resultant antenna coverage patterns may be both highly directional and able to provide steerable coverage throughout a relatively wide area around the MAA.

These dynamically configurable MAAs may be included with or implemented by stations (e.g., access points, mobile devices, cells, or the like) that may be configured to operate in accordance with various wireless network standards. For example, these wireless network standards may include standards promulgated by the Institute of Electrical Engineers (IEEE), $3^{rd}$ Generation Partnership Project (3GPP), or other standard setting organizations.

Figure 1A:
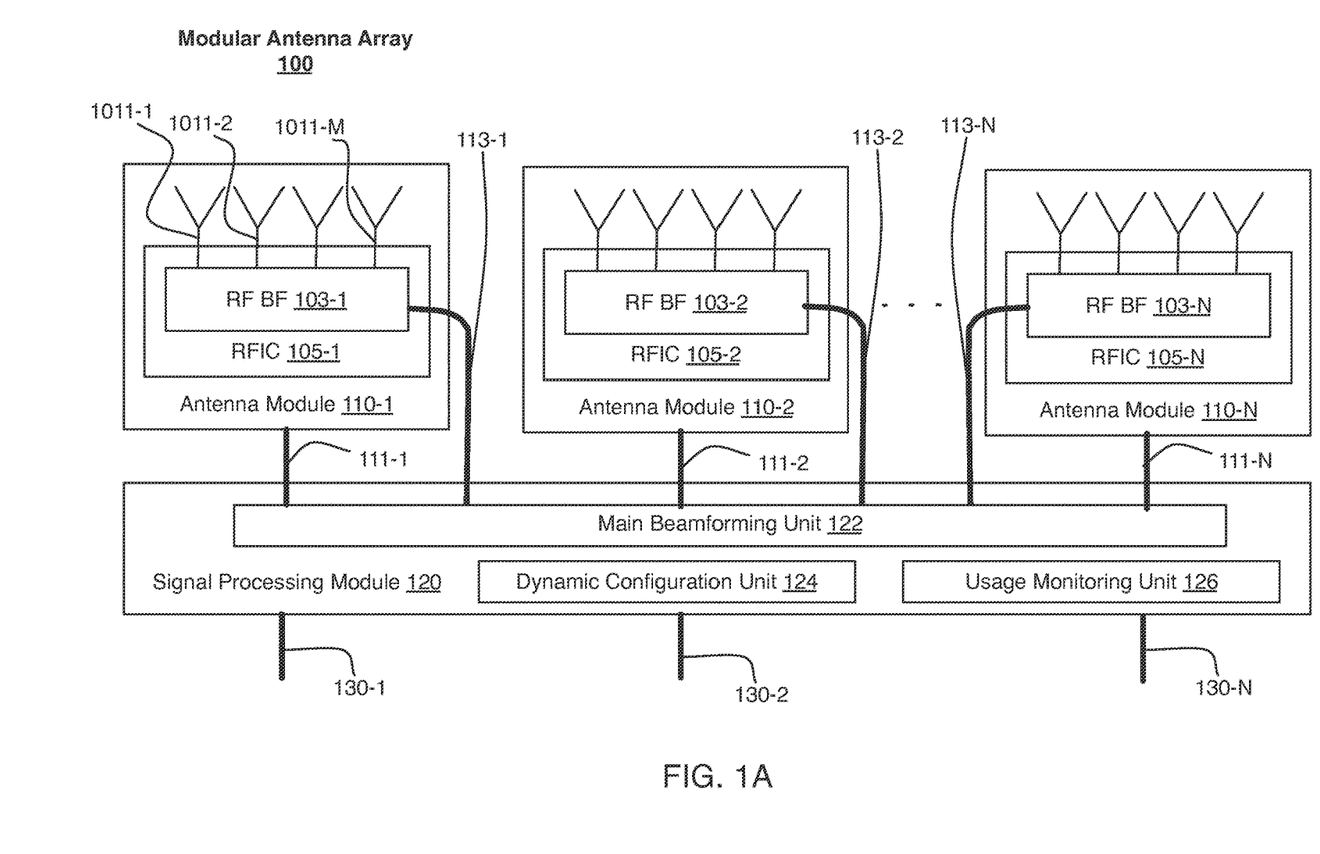
FIGS. 1A-1B illustrate an example a modular antenna array (MAA) system according to an embodiment.
Figure 1B:
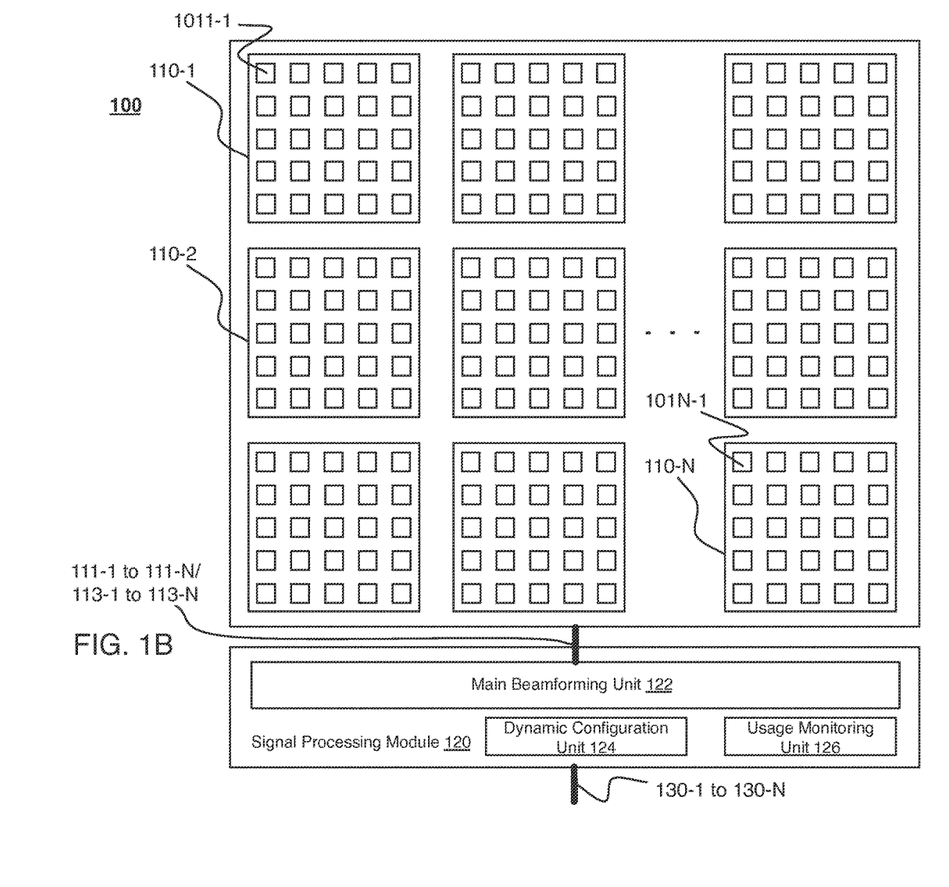

FIGS. 1A-1B are block diagrams illustrating an example MAA 100. In general, FIG. 1A illustrates a schematic view of the MAA 100 while FIG. 1B illustrates a planar view of the MAA 100. It is to be appreciated, that although FIGS. 1A-1B illustrate the MAA 100 from different "views" or perspectives, examples are not limited in this context. In some examples, the MAA 100 includes a number of antenna modules 110-1 to 110-N coupled to a signal processing module 120. In general, the signal processing module 120 may provide various signal processing operations for the MAA 100. For example, the signal processing module 120 may apply frequency offset compensation, synchronization, equalization, up-conversion, or down-conversion, on signals to be transmitted or signals received by the MAA 100.

In some examples, the MAA 100 may be implemented in a wireless system, such as, for example, as an access point, a base station, a cell, a mobile device, or the like. As a particularly illustrative example, the MAA 100 may be implemented as a small cell BS in a mobile broadband network, such as, for example, a mobile broadband network operating in compliance with at least one or more wireless communication standards.

Turning more specifically to FIG. 1A, an exemplary layout of the components of the MAA 100 is shown. As depicted, the MAA 100 includes the antenna modules 110-1 to 110-N. A single, but unspecific antenna module may be referred to herein as antenna module 110. Furthermore, each of the antenna modules 110-1 to 110-N may be substantially identical. An antenna module 110 may include an RF integrated circuit ("RFIC") 105. The RFIC 105 may include an RF beam-forming ("RFBF") circuit 103. The RFBF 103 may be coupled to a number of antenna elements 101n (where n corresponds to the reference designator used to identify the particular antenna module.)

For example, the antenna module 110-1 is depicted including the RFIC 105-1, which includes the RFBF 103-1, which is coupled to the antenna elements 1011-1 to 1011-M. It is to be appreciated that not all antenna elements are marked with reference designators for purposes of clarity. Furthermore, it is to be appreciated that the number of antenna elements includes with each module 110 may vary depending upon the implementation. The number depicted in the figures is merely shown at a quantity to facilitate understanding. Examples are not limited in this context.

Each of the antenna modules 110 are communicatively coupled via respective data links 111-1 to 111-N and control links 1131- to 113-N to signal processing module 120, and in particular to main beamforming unit 122. Signal processing module 120 is further connected to a transmitter and/or processor (not illustrated in FIGS. 1A-1B) via data ports 130. Additionally, the signal processing module 120 includes a dynamic configuration unit 124 and a usage monitoring unit 126. Although described herein as being implemented in the signal processing unit 120, it is to be appreciated, that the dynamic configuration unit 124 and usage monitoring unit 126 may be implemented in a transmitter and/or processor connected to the signal processing module 120. Examples are not limited in this context.

Turning more specifically to FIG. 1B, the antenna modules 110-1 to 110-N are depicted in planar view. The array of antenna elements 101 in each antenna module 110 is depicted in FIG. 1B as a square 5×5 matrix. As stated, however, the number of antenna elements 101 may differ depending upon the implementation. Furthermore, in some examples the number of antenna elements may not necessarily be a square. Said differently, the antenna elements 101 of antenna modules 110 may be arranged in a non-square (e.g., rectangular, circular, or the like) arrangement. It is to be appreciated that the array of elements 101 in each antenna module 110 may be facing in different physical directions depending upon the implementations. Examples are not limited in this context.

In general, the MAA 100 may be dynamically reconfigured during operation to support multiple independent usages (e.g., users, use cases, environments, and/or data rates.) More specifically, each of the antenna modules 110 may be configured to generate an antenna beam based on one or more of the multiple usages. Said differently, the MAA 100 can be reconfigured in real time (e.g., during operation) to improve the sharing of its resources (e.g., antenna modules 110) among different requirements in several different and independent modes of operation. As will be described in greater detail below, this may be facilitated by a feedback mechanism between user equipment and the MAA 100, at which the competing resource needs are negotiated from among the available resources.

In some examples, the signal processing module 120 and/or components of the signal processing module 120 may be implemented as circuitry (not shown) and/or firmware executable on circuitry. The circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as the circuitry to implement signal processing component 120. According to some examples the circuitry may also be an application specific integrated circuit (ASIC), a field programmable gate array (FPGA) and components of the signal processing module (e.g., main beamforming unit 122, dynamic configuration unit 124, and usage monitoring unit 126 may be implemented as hardware elements of the ASIC or FPGA.

In operation, the signal processing module 120 may receive indications of a usage for one of the modules 110 and generate signal adjustments for the module. More specifically, the dynamic configuration unit 124 may receive an indication of a usage for a one of the antenna modules 110. In some examples, the indication may be a request for utilization of resources of the MAA 100. Accordingly, the dynamic configuration unit 124 may determine a resource requirement corresponding to the usage. More specifically, the dynamic configuration unit 124 may determine resources (e.g., antenna modules, or the like) of the MAA 100 to needed to meet the resource request.

The main beamforming unit 122 may generate signal adjustments relative to the antenna module to control the antenna beam associated with the antenna module based at least in part on the usage. Said differently, the main beamforming unit 122 may generate signals to cause the antenna module 110 to generate an antenna beam based on the usage. These signals may be conveyed to the antenna module 110 via the control link 113. Said differently, the signal processing module 120 may send commands to the antenna modules 110 regarding desired antenna patterns, e.g., direction to point a steerable beam. The signal processing module 120 may further specify the amplitudes and phases to apply to signals to and from individual antenna elements 101 of an antenna module 110 based on the usage of that antenna module 110. Within an antenna module 110, the RFIC 105 and RFBF 103 control the phase shifts and attenuations (or gains) associated with each antenna element 101 in order to achieve the desired beam pattern.

As an example, the dynamic configuration unit 124 may receive an indication of a usage for the antenna module 110-1. The main beamforming unit 122 may generate signals to cause the antenna module 110-1 to generate an antenna beam (not shown) based on the usage. These signals may be conveyed to the antenna module 110-1 via the control link 113-1. It is to be appreciated, that a variety of techniques may be implemented to generate signals to cause an antenna module 110 to generate an antenna beam. In general, however, the signals may include signal magnitude adjustments and signal phase adjustments. These signal adjustments may cause the antenna elements 101 of the antenna module 110 to generate signals that combine and form an antenna beam.

As will be described in greater detail herein, each of the antenna modules 110 may be dynamically configured to support independent uses. For example, one module may support a first use, a second module may support a second use, etc. As another example, a first module may support a first use and a second and a third module may support a second use. As a still additional example, a first module may support a first use and a second module may support a second use and a third use. It is to be appreciated that as used herein, the terms "first" "second" "third" or the like are not meant to indicate first, second, etc. in time, or to otherwise indicate a particular ordering. Instead, the terms are used for convenience in referring to multiple uses and/or antenna modules as referenced herein to describe various example embodiments.

Furthermore, in operation the signal processing module 120 may receive indications of a feedback related to a usage of one of the antenna modules and generate updated signal adjustments for the antenna module to cause the antenna module to generate an antenna beam based at least in part on the feedback. More specifically, the usage monitoring unit 126 may receive an indication of feedback corresponding to the use for one of the antenna modules. The main beamforming unit 122 may generate updated signal adjustments for the antenna module based at least in part on the feedback. For example, for a first use of the antenna module 110-1, the usage monitoring unit 126 may receive feedback related to the usage. The main beamforming unit 122 may generate updated signal adjustments for the antenna module 110-1 based at least in part on the feedback. The signal adjustments may cause the antenna module 110-1 to generate an updated and/or different antenna beam for the first use. In general, the feedback may be any information corresponding to the usage of the antenna module. With some examples, the feedback may be an indication of channel quality, quality of service, change in usage, request for increased data rate, change in physical position of the device corresponding to the usage, or the like.

Furthermore, the dynamic configuration unit 124 may recognize the utilization of the beamsteering angles of the antenna modules 110 and determine that users are sufficiently co-located in either the horizontal or vertical planes to allow antenna modules 110 be reconfigured to satisfy various system requirements (e.g., quality of service, or the like.) This may include activating and/or deactivating antenna modules 110 as appropriate. It is to be appreciated that the various usages of the antenna modules may change as users enter and/or leave the area serviced by the MAA 100, as users service requirements change, as users move within the service area, or the like. Examples are not limited in this context.

Figure 2:
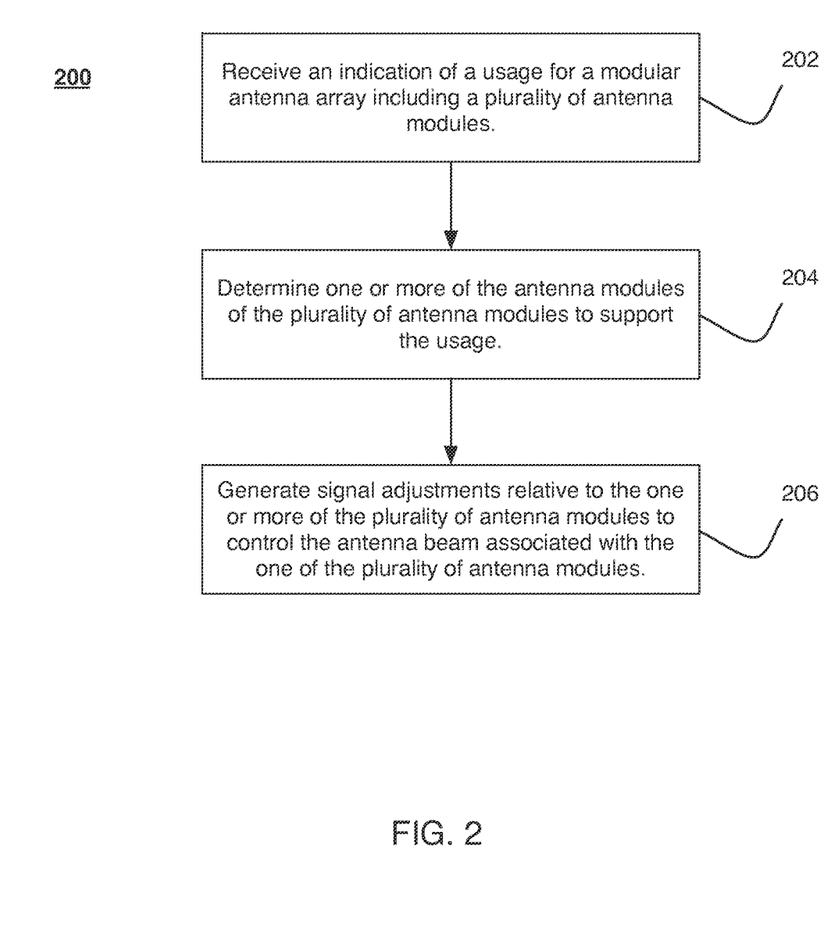
FIG. 2 illustrates an example of a logic flow for dynamically configuring a MAA for multiple independent usages according to an embodiment.

FIG. 2 illustrates an example of a logic flow 200. The logic flow 200 may be representative of some or all of the operations executed by one or more logic, features, or devices described herein, such as the MAA 100, the signal processing module 120, the main beamforming unit 122, the dynamic configuration unit 124, and/or the usage monitoring unit 126. In particular, the signal processing module 120 may implement the logic flow 200 in a MAA system to dynamically configure various antenna modules within the MAA system to support multiple independent usages.

In the logic flow 200, at block 202, receive an indication of a usage for a modular antenna array including a plurality of antenna modules; an indication of a usage of a modular antenna array is received. For example, the signal processing module 120 may receive an indication of a usage for the MAA 100 (e.g., from a transmitter and/or processor operably connected to the signal processing module 120.)

At block 204, determine one or more of the antenna modules of the plurality of antenna modules to support the usage; one of the antenna modules of the modular antenna array that can support the usage may be determined. For example, one of the antenna modules 110 of the MAA 100 that can support the usage may be determined. More specifically, the dynamic configuration unit 124 of the signal processing module 120 may determine one of the antenna modules 110 to support the usage. In some examples, the multiple usages or requests for resources may be balanced. For example, antenna modules may be selected from available antenna modules. As another example, antenna modules may be repurposed. As a particularly illustrative example, a first user may be connected to the MAA 100 at a high data rate when few other users are connected. However, if demands on the MAA 100 change, the data rate provided to the first user may be reduced to facilitate balancing the quality of service provided to all users.

At block 206, generate signal adjustments relative to the one or more of the plurality of antenna modules to control the antenna beam associated with the one of the plurality of antenna modules; signal adjustments for the one of the antenna modules 110 may be generated to cause the antenna module for form an antenna beam to support the usage. For example, the main beamforming unit 122 may generate the signal adjustments for an antenna module 110.

Figure 3:
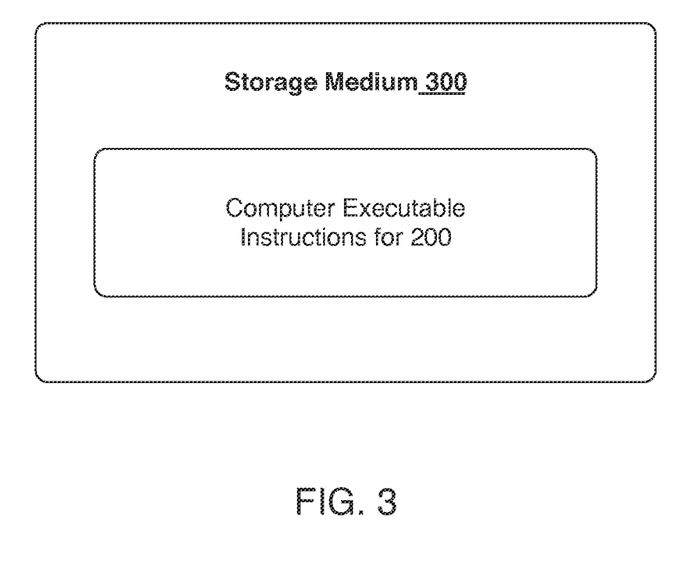
FIG. 3 illustrates an embodiment of a storage medium.

FIG. 3 illustrates an embodiment of a storage medium 300. The storage medium 300 may comprise an article of manufacture. In some examples, the storage medium 300 may include any non-transitory computer readable medium or machine readable medium, such as an optical, magnetic or semiconductor storage. The storage medium 300 may store various types of computer executable instructions, such as instructions to implement logic flow 200. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Thus a dynamically configurable MAA capable of supporting multiple independent usages simultaneously is described. As compared to conventional single-user MIMO antenna usage, embodiments disclosed herein selectively, adaptively, and simultaneously provide one or more of several modes of operation for the MAA antenna (e.g., the MAA 100.) These modes of operation may be changed, reallocated, switched on/off, etc. as the number of users and/or their data needs change.

In some embodiments, performance of the MAA (e.g., MAA 100) may be improved by increasing the spatial separation of the antenna modules (e.g., antenna modules 110.) For example, side-by-side antenna modules may not provide the best diversity. Instead, antenna modules from opposite sides or opposite corners of the MAA may be selected when needed. With some embodiments, virtual antenna modules may be selected and/or organized. For example, over the entire MAA, every second (or third etc.) antenna element (or row or column) can form a separate virtual antenna module.

As described above, the MAA, while employing a finite number of antenna modules can be reconfigured in real time to improve the sharing of its resources (e.g., antenna modules) among different user requirements in several different and independent modes of operation.

Furthermore, as described, the present disclosure may include a feedback mechanism between user equipment (e.g. mobile devices receiving antenna beams generated by the antenna arrays) and the MAA, at which the competing resource needs of the user equipment are negotiated from among the available resources. In some examples, the MAA may recognize the utilization of its own beamsteering angles and determine that users are sufficiently co-located in either the horizontal or vertical planes to allow antenna modules or other portions of the MAA to be deactivated (e.g. powered off) as appropriate.

In contrast with multi user MIMO schemes, which involve spatially coded signaling on an antenna element-by-element basis, embodiments of the present disclosure adapt signals to each user or group of users at the resolution of a group of antenna elements (e.g., an antenna module, or the like.) More specifically, embodiments described herein partition a MAA into antenna modules, which can be configured in a more flexible manner for different scenarios and environments. However, as will be appreciated, all antenna elements within an antenna module of the MAA system transmit the same signals.

Figure 4:
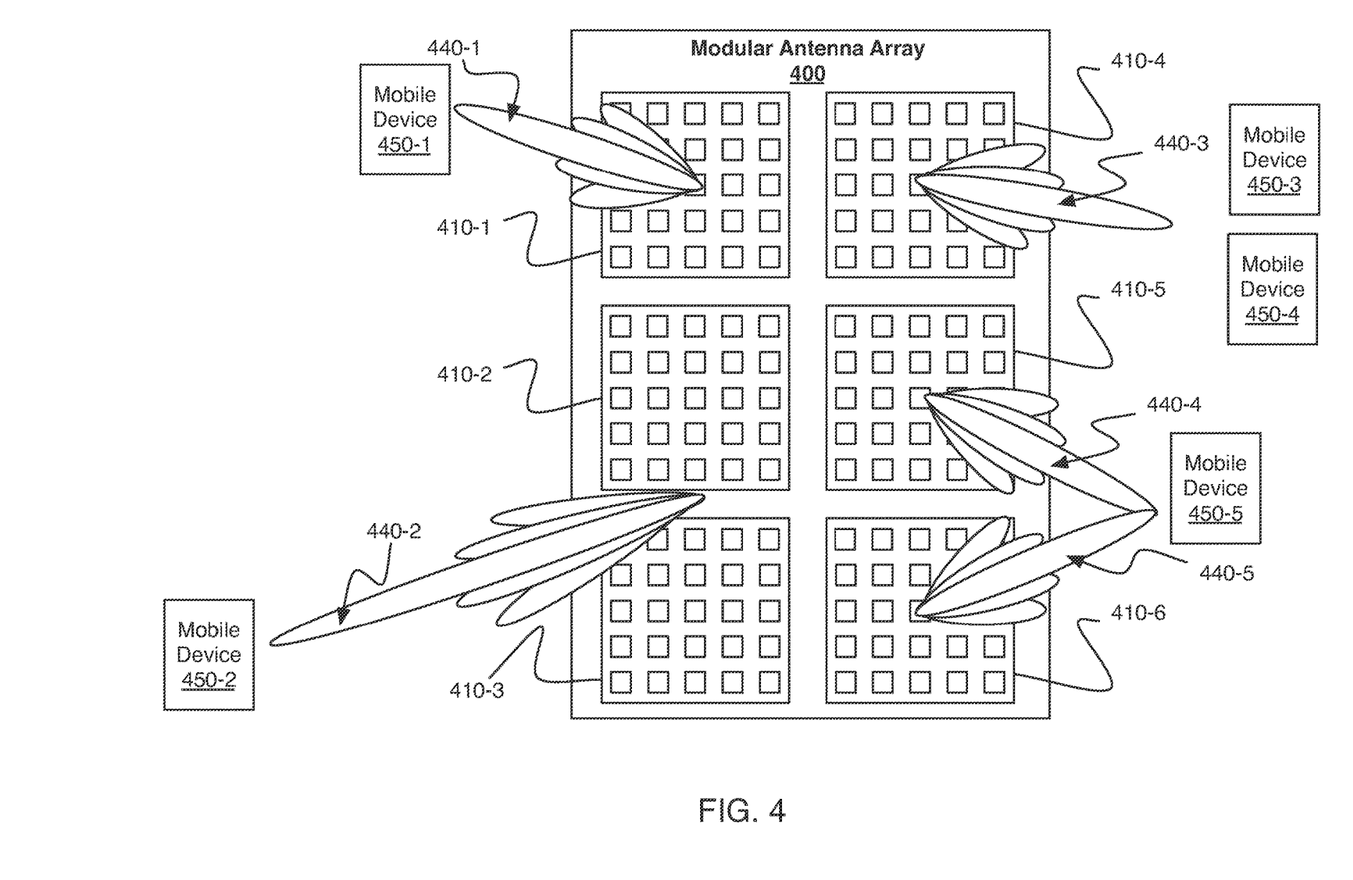
FIG. 4 illustrates an example MAA and example antenna beam patterns according to an embodiment.

Thus, a dynamically configurable MAA, which provides for the support of multiple independent uses, is described. It is to be appreciated that it is not feasible to provide an exhaustive list of all possible use cases. However, to facilitate understanding of the example embodiments detailed herein, a few illustrative use cases are described below in conjunction with FIG. 4. It is to be appreciated that these examples are given for illustration only and are not intended to be limiting. In general FIG. 4 illustrates a dynamically configurable MAA 400 that includes six identical antenna modules 410-1 to 410-6. FIG. 4 illustrates a planar view of the MAA 400. However, it will be appreciated that each of the antenna modules 410 include an RFIC and an RFBF (both not shown.) Furthermore, the MAA 400 also includes a signal processing module (not shown) to dynamically configure the antenna modules 410 to support multiple independent uses. With some examples, the MAA 400 may be substantially identical to the MAA 100 described above, except for the number of antenna modules depicted.

The antenna modules 410-1 to 410-6 are depicted producing antenna beams 440-1 to 440-5 in order to wirelessly communicate with mobile devices 450-1 to 450-5. Usage of the MAA 400 will be described below in greater detail with reference to the antenna beams 440 and the mobile devices 450. It is to be appreciated that the mobile devices 450 may be any of a variety of devices capable of communicating wirelessly using antenna beam 440. For example, without limitation, the mobile devices 450 may include a smart phone, a tablet computer, a mobile hotspot, another station in a mobile broadband network, or the like.

It is to be appreciated that the illustrated beam patterns 440 are not necessarily drawn to scale relative to the illustrated antenna element separation distance or the size of each antenna module 410. There is also assumed to be sufficient angular separation between mobile devices 450 as viewed from the MAA 400, unless a shared-access scheme such as time-division multiplex ("TDM") or frequency-division multiplex ("FDM") is used.

Furthermore, it is to be appreciated that the MAA 400 may be partitioned and configured at the antenna element level. Said differently, in some examples, portions of antenna modules 410 (e.g., odd-numbers of antenna elements, rows or columns of antenna elements, even-numbered antenna elements) may be configured to support a usage. Examples are not limited in this context.

Furthermore, it is presumed that sufficient channel conditions exist to allow usage of a subset of the resources otherwise available with the entire MAA 400. It will be appreciated that due to physical constraints and/or the limits of array size and transmit power needed to provide a threshold quality of service, a single antenna module 410 may have a relatively limited range and corresponding data rate. Nevertheless, with a sufficiently-sized MAA, single antenna modules may be configured as described to service independent uses while satisfying any quality of service thresholds and/or necessary data rates.

Turning more specifically to FIG. 4, the antenna module 410-1 is depicted producing a single antenna beam. More specifically, the antenna module 410-1 is depicted producing the antenna beam 440-1, which is used to support a single mobile device 450-1. In general, the antenna beam 440-1 may be used to support the mobile device 450-1 when the mobile device 450-1 is sufficiently close to MAA 400 and has sufficiently good channel propagation characteristics. The antenna beam 440-1 may support a standard rate and standard directivity (i.e., gain and beamwidth) for a user of the mobile device 450-1. The antenna module 410-1 may serve another mobile device (not shown), but such a mobile device would be located outside the boresight of the antenna beam 440-1 when it is pointed at the mobile device 450-1, and should share beam 440-1 in a TDM manner using beamsteering.

The antenna module 410-4 is depicted producing a single antenna beam. More specifically, the antenna module 410-4 is depicted producing the antenna beam 440-3, which is used to support two mobile devices 450-3 and 450-4. In general, the antenna beam 440-3 may be used to support the mobile devices 450-3 and 450-4 when the mobile devices 450-3 and 450-4 are sufficiently close to the MAA 400 and channel propagation characteristics are sufficient to provide an acceptable level of quality of service for the users of the mobile devices 450-3 and 450-4. The mobile devices 450-3 and 450-4 must share access to the antenna beam 440-3 by using a multiple access scheme such as TDM or FDM.

The antenna modules 410-2 and 410-3 are depicted producing a single combined antenna beam. More specifically, the antenna modules 410-2 and 410-3 are depicted producing the antenna beam 440-2, which is used to support a single mobile device 450-2. In general, the antenna beam 440-2 may be used to support the mobile device 450-2 when the mobile device 450-2 has communication requirements (e.g., quality of service requirements) that cannot be satisfied by a single antenna module. For example, the mobile device 450-2 may be located too far away from the MAA 400 to be serviced by a single antenna module 410. As another example, the mobile device 450-2 may have a relatively higher data rate than the other mobile devices 450 (e.g., watching high definition video, or the like). The combination of antenna modules 410-2 and 410-3 then are used to produce a single antenna beam (e.g., 440-2) that has higher directivity than is achievable from a single antenna beam generated by a single antenna module.

The antenna modules 410-5 and 410-6 are each depicted producing a single antenna beam to service a single mobile device. More specifically, the antenna module 410-5 is depicted producing the antenna beam 440-4 while the antenna module 410-6 is depicted producing the antenna beam 440-5. Both antenna beams 440-4 and 440-5 are used to support the mobile device 450-5. In general, the antenna beams 440-4 and 440-5 may be used to support the mobile device 450-5 when the module device 450-5 has communication requirements (e.g., quality of service requirements) that cannot be satisfied by a single antenna module. In contrast to the single antenna beam 440-2 used to support the module device 450-2, the two antenna beams 440-4 and 440-5 produced by antenna modules 410-5 and 410-6 arrive at the mobile device 450-5 from different angles, thereby producing spatial diversity that may be useful for overcoming multipath interference or fading.

Note that in the scenarios described above in connection with FIG. 4, the data sent to each mobile device can be entirely independent and unique as each antenna module 410 employs its own radio, signaling and beamforming. This also implies that each antenna module 410 may have its own framing (e.g., an OFDMA frame) to serve uplink and downlink traffic to/from users.

Other configurations not illustrated in FIG. 4 may also be used to increase power efficiency of the MAA. For example, where the MAA resources are deemed more than adequate for the user requirements (e.g., suppose all of the users may be sufficiently close to the MAA and have sufficiently low data rate requirements for a threshold quality of service level to be met by less than all of the MAA resources) one or more of the antenna modules 410 may be individually powered off to reduce power needs of the MAA. More specifically, the individual RF circuitry of ones of the antenna modules 410 may be shut off in order to provide power savings and reduce RF interference with neighboring base stations. As resources change (e.g., increase) the powered off antenna modules 410 may be powered on to meet the increased demand on resources.

In another scenario of additional flexibility, suppose mobile devices are physically located such that they have nearly the same elevation relative to the MAA antenna, but at substantially different azimuth. Such a situation may occur for an indoor deployment in an office setting, where the MAA may be mounted at desktop level. In this scenario, the beamsteering capability of the MAA in the unused plane (i.e., in elevation) may be reduced by switching off entire rows of array modules, thus also providing power savings and reduce RF interference with neighboring base stations. A similar situation exists when the users are in similar azimuth but different elevation, in which case columns of the MAA antenna may be switched off.

Figure 5:
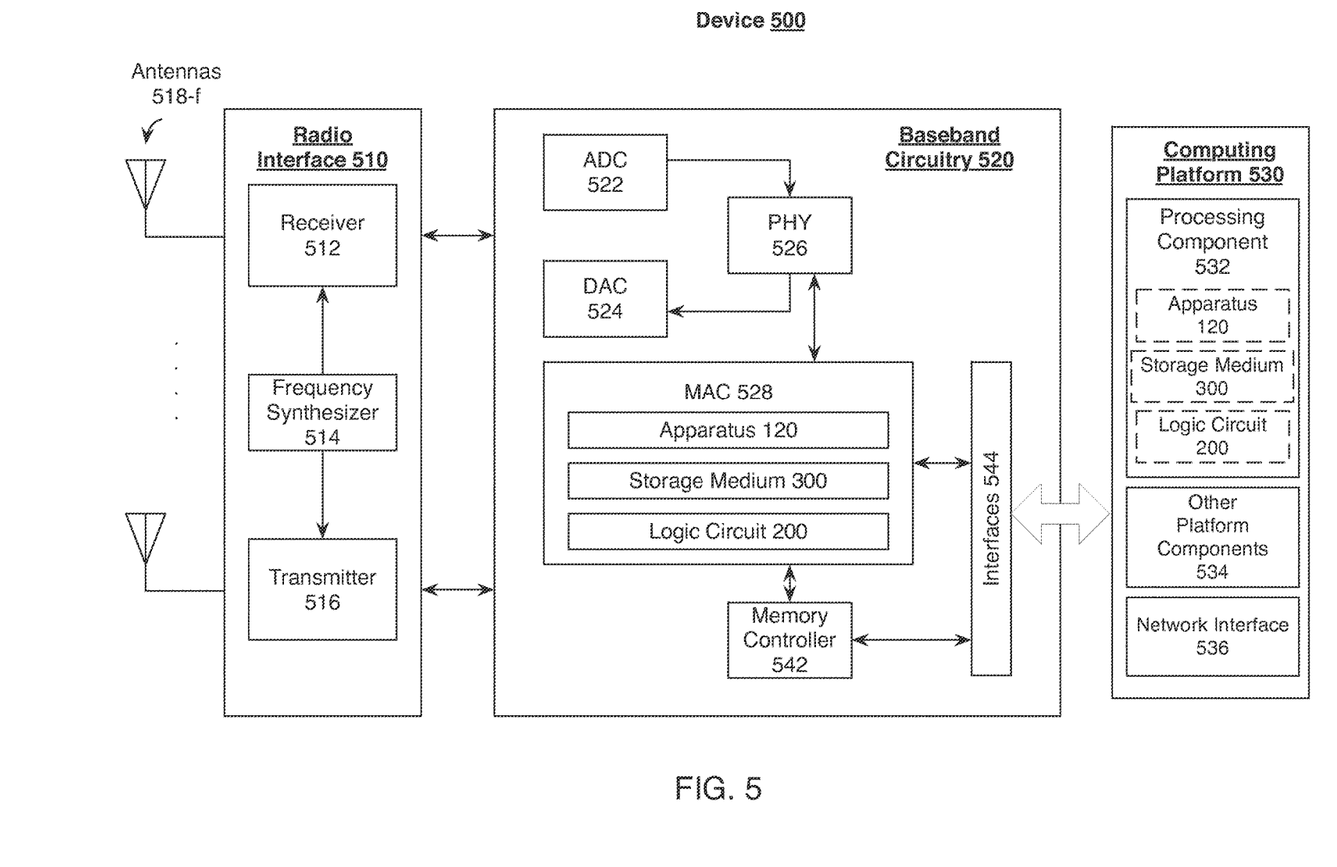
FIG. 5 illustrates a device according to an embodiment.

FIG. 5 illustrates an embodiment of a device 500. In some examples, device 500 may be configured or arranged to provide dynamic configuration of an MAA (e.g., the MAA 100) for multiple independent uses. In some examples, the MAA 100 may be implemented in the device 500. For example, the device 500 may implement the antenna modules as antennas 518 and radio interface 510 while the signal processing module 120 (apparatus 120 in FIG. 5) may be implemented as signal processing circuitry 520 and/or computing platform 530. Additionally, the device 500 may implement storage medium 300 and/or a logic circuit 200. The logic circuit 200 may include physical circuits to perform operations described for the apparatus 120, storage medium 300, and/or logic flow 200. Examples are, however, not limited in this context.

The device 500 may implement some or all of the structure and/or operations for the apparatus 2200, the storage medium 700 and/or the logic circuit 2600 in a single computing entity, such as entirely within a single device. The embodiments are not limited in this context.

Radio interface 510 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 510 may include, for example, a receiver 512, a transmitter 516 and/or a frequency synthesizer 514. Radio interface 510 may include bias controls, a crystal oscillator and antennas 518-1 to 518-f. In another embodiment, radio interface 510 may use external voltage-controlled oscillators (VCOs), surface acoustic wave filters, intermediate frequency (IF) filters and/or RF filters, as desired. Due to the variety of potential RF interface designs an expansive description thereof is omitted.

Signal processing circuitry 520 may communicate with radio interface 510 to process receive and/or transmit signals and may include, an analog-to-digital converter 522 and/or a digital-to-analog converter 524 for use in processing receive/transmit signals (e.g., up converting, down converting, filtering, sampling or the like.) Further, signal processing circuitry 520 may include a baseband or physical layer (PHY) processing circuit 526 for PHY link layer processing of respective receive/transmit signals. Signal processing circuitry 520 may include, for example, a processing circuit 528 for medium access control (MAC)/data link layer processing. Signal processing circuitry 520 may include a memory controller 542 for communicating with MAC processing circuit 528 and/or a computing platform 530, for example, via one or more interfaces 544.

In some examples, the MAC 528 may be configured to include and/or perform the structures and/or methods described herein. Said differently, the MAC 512 may be configured to include the signal processing module 120 (e.g., embodied as apparatus 120). As another example, the MAC 528 may be configured to include the storage medium 300. As another example, the MAC 528 may be configured to implement logic circuit 200. As another example, the MAC 528 may access the computing platform 530 to implement and/or perform the structure and/or methods described herein.

In some embodiments, PHY processing circuitry 526 may include a frame construction and/or detection module, in combination with additional circuitry such as a buffer memory, to construct and/or deconstruct communication frames (e.g., containing subframes). Alternatively or in addition, MAC processing circuit 528 may share processing for certain of these functions or perform these processes independent of PHY processing circuit 526. In some embodiments, MAC and PHY processing may be integrated into a single circuit.

Computing platform 530 may provide computing functionality for device 2000. As shown, computing platform 530 may include a processing component 532. In addition to, or alternatively of, signal processing circuitry 520 of device 2000 may execute processing operations or logic for the apparatus 2200, storage medium 700, and logic circuit 2600 using the processing component 530. Processing component 532 (and/or PHY 526 and/or MAC 528) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 530 may further include other platform component 534. Other platform components 534 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 530 may further include a network interface 536. In some examples, network interface 536 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 2000 may be part of a source or destination node in a MIMO system and may be included in various types of computing devices to include, but not limited to, user equipment, a computer, a personal computer (PC), a desktop computer, a laptop computer, a notebook computer, a net-book computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, wearable computing device or combination thereof. Accordingly, functions and/or specific configurations of device 2000 described herein; may be included or omitted in various embodiments of device 2000, as suitably desired. In some embodiments, device 2000 may be configured to be compatible with protocols and frequencies associated with IEEE 802.11 Standards or Specification and/or 3GPP Standards or Specifications for MIMO systems, although the examples are not limited in this respect.

The components and features of device 2000 may be implemented using any combination of discrete circuitry, application specific integrated circuits (ASICs), logic gates and/or single chip architectures. Further, the features of device 2000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 2000 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

A dynamically configurable MAA system. The MAA system including a plurality of antenna modules, each of the antenna modules comprising an array of antenna elements coupled to a radio frequency (RF) beamforming circuit, the RF beamforming circuit to adjust phase shifts associated with the antenna elements to generate an antenna beam associated with the antenna module, a dynamic configuration unit to receive an indication of a usage for a one of the plurality of antenna modules, and a main beamforming unit coupled to the dynamic configuration unit and each of the antenna modules, the main beamforming unit to generate signal adjustments relative to the one of the plurality of antenna modules to control the antenna beam associated with the one of the plurality of antenna modules based at least in part on the usage.

Example 2

The system of example 1, the dynamic configuration unit to determine a resource requirement corresponding to the usage.

Example 3

The system of example 2, the dynamic configuration unit to determine the one of the antenna modules based at least in part on the resource requirement.

Example 4

The system of any one of examples 1 to 3, wherein the usage is a first usage and the one of the plurality of antenna modules is a first one of the plurality of antenna modules, the dynamic configuration unit to receive an indication of a second usage for a second one of the plurality of antenna modules and the main beamforming unit to generate signal adjustments relative to the second one of the plurality of antenna modules such that the antenna beam associated with the second one of the plurality of antenna modules is generated based at least in part on the second usage.

Example 5

The system of example 4, the antenna beam associated with the first antenna module being independently steerable from the antenna beam associated with the second antenna module.

Example 6

The system of any one of examples 4 to 5, the first antenna beam being steerable to support a first mobile device and a second mobile device.

Example 7

The system of example 6, the first antenna beam being shared between the first and second mobile device using time-division multiplexing or frequency-division multiplexing.

Example 8

The system of any one of examples 1 to 3, wherein the usage is a first usage and the one of the plurality of antenna modules is a first one of the plurality of antenna modules, the dynamic configuration unit to receive an indication of a second usage for a second and a third one of the plurality of antenna modules and the main beamforming unit to generate signal adjustments relative to the second and the third one of the plurality of antenna modules such that the antenna beams associated with the second and third one of the plurality of antenna modules is generated based at least in part on the second usage.

Example 9

The system of example 8, wherein the antenna beams associated with the second and the third one of the plurality of antenna modules are independently steerable antenna beams and are each aimed as a single mobile device to increase spatial diversity to overcome multipath interference or fading.

Example 10

The system of example 8, wherein the antenna beam associated with the second and third one of the plurality of antenna modules combine to form a composite antenna beam to increase directivity of the antenna beam to overcome attenuation losses.

Example 11

The system of any one of examples 1 to 3, wherein the usage is a first usage and the one of the plurality of antenna modules is a first one of the plurality of antenna modules, the dynamic configuration unit to receive an indication of a second usage and a third usage for a second one of the plurality of antenna modules and the main beamforming unit to generate signal adjustments relative to the second one of the plurality of antenna modules such that the antenna beam associated with the second one of the plurality of antenna modules is generated based at least in part on the second usage and the third usage.

Example 12

The system of any one of examples 2 to 11, wherein the first usage and the second usage correspond to a first station and a second station.

Example 13

The system of example 12, where the first station, the second station, or both the first and the second station correspond to a mobile device.

Example 14

The system of any one of examples 2 to 13, further comprising a usage feedback unit to receive indications of a feedback corresponding to the first usage, the main beamforming unit to generate updated signal adjustments relative to the first one of the plurality of antenna modules to control the antenna beam associated with the first one of the plurality of antenna modules based at least in part on the feedback.

Example 15

The system of any one of examples 2 to 14, the dynamic configuration unit to power off one or more of the plurality of antenna modules based on the first usage.

Example 16

The system of any one of examples 1 to 15, wherein the signal adjustments include signal magnitude adjustments and signal phase adjustments.

Example 17

The system of any one of examples 1 to 16, wherein at least one of the main beamforming unit, the dynamic configuration unit, or the usage feedback unit are a signal processor, an intermediate frequency processor and/or an RF processor.

Example 18

The system of any one of examples 1 to 17, wherein the RF beamforming circuits are RFICs and the antenna modules are configured to operate in a millimeter wave frequency range.

Example 19

A method implemented in a MAA system. The method including receiving an indication of a usage for a modular antenna array including a plurality of antenna modules, each of the antenna modules comprising an array of antenna elements coupled to a radio frequency (RF) beamforming circuit, the RF beamforming circuit to adjust phase shifts associated with the antenna elements to generate an antenna beam associated with the antenna module, determining a one of the antenna modules of the plurality of antenna modules to support the usage, and generating signal adjustments relative to the one of the plurality of antenna modules to control an antenna beam associated with the one of the plurality of antenna modules based at least in part on the usage.

Example 20

The method of example 19, determining a resource requirement associated with the usage, the determining the one of the antenna modules of the plurality of antenna modules to support the usage based at least in part on the resource requirement.

Example 21

The method of any one of examples 19 to 20, wherein the usage is a first usage and the one of the plurality of antenna modules is a first one of the plurality of antenna modules, the method further including receiving an indication of a second usage for the modular antenna array, determining a second one of the plurality of antenna modules to support the second usage, and generating signal adjustments relative to the second one of the plurality of antenna modules such that an antenna beam associated with the second one of the plurality of antenna modules is generated based at least in part on the second usage.

Example 22

The method of example 21, the antenna beam associated with the first antenna module being independently steerable from the antenna beam associated with the second antenna module.

Example 23

The method of any one of examples 21 to 22, the first antenna beam being steerable to support a first mobile device and a second mobile device.

Example 24

The method of example 23, the first antenna beam being shared between the first and second mobile device using time-division multiplexing or frequency-division multiplexing.

Example 25

The method of any one of example 19 to 20, wherein the usage is a first usage and the one of the plurality of antenna modules is a first one of the plurality of antenna modules, the method further including receiving an indication of a second usage for the modular antenna array, determining a second and a third one of the plurality of antenna modules to support the usage, and generating signal adjustments relative to the second and the third one of the plurality of antenna modules such that the antenna beam associated with the second and third one of the plurality of antenna modules is generated based at least in part on the second usage.

Example 26

The method of example 25, wherein the antenna beams associated with the second and the third one of the plurality of antenna modules are independently steerable antenna beams and are each aimed as a single mobile device to increase spatial diversity to overcome multipath interference or fading.

Example 27

The method of example 25, wherein the antenna beam associated with the second and third one of the plurality of antenna modules combine to form a composite antenna beam to increase directivity of the antenna beam.

Example 28

The method of any one of examples 19 to 20, wherein the usage is a first usage and the one of the plurality of antenna modules is a first one of the plurality of antenna modules, the method further including receiving an indication of a second usage and a third usage for the modular antenna array, determining a second one of the plurality of antenna modules to support the second usage and the third usage, and generating signal adjustments relative to the second one of the plurality of antenna modules such that the antenna beam associated with the second one of the plurality of antenna modules is generated based at least in part on the second usage and the third usage.

Example 29

The method of any one of examples 21 to 28, wherein the first usage and the second usage correspond to a first station and a second station.

Example 30

The method of example 29, where the first station, the second station, or both the first and the second station correspond to a mobile device.

Example 31

The method of any one of examples 21 to 30, further comprising a usage feedback unit to receive indications of a feedback corresponding to the first usage, the main beam-forming unit to generate updated signal adjustments relative to the first one of the plurality of antenna modules to control the antenna beam associated with the first one of the plurality of antenna modules based at least in part on the feedback.

Example 32

The method of any one of examples 21 to 31, powering on or off one or more of the plurality of antenna modules based on the first usage.

Example 33

The method of any one of examples 19 to 32, wherein the signal adjustments include signal magnitude adjustments and signal phase adjustments.

Example 34

An apparatus comprising means to perform the method of any one of examples 19 to 33.

Example 35

At least one machine readable medium comprising a plurality of instructions that in response to being executed on a signal processing module in a modular antenna array system cause the receiver to perform the method of any one of examples 19 to 33.

The invention claimed is:

1. A dynamically configurable modular antenna system comprising:
a plurality of antenna modules, each of the antenna modules coupled with one of a plurality of radios and comprising an array of antenna elements coupled to one of a plurality radio frequency (RF) beamforming circuit, the plurality of RF beamforming circuits to adjust phase shifts associated with the antenna elements to generate antenna beams for the antenna modules;
a dynamic configuration unit comprising circuitry to receive an indication of a first usage for a first one of the plurality of antenna modules, and receive an indication of a second usage for a second one of the plurality of antenna modules; and
a main beamforming unit comprising circuitry coupled to the dynamic configuration unit and each of the antenna modules, the main beamforming unit to generate signal adjustments relative to the first one of the plurality of antenna modules to control a first antenna beam associated with the first one of the plurality of antenna modules based at least in part on the first usage, and generate signal adjustments relative to the second one of the plurality of antenna modules such that a second antenna beam associated with the second one of the plurality of antenna modules is generated based at least in part on the second usage, wherein the first usage and the second usage correspond to a first station and a second station, respectively, and
wherein the first one of the plurality of antenna modules to communicate first data with the first station via a first radio of the plurality of radios and utilizing a first orthogonal frequency division multiple access (OFDMA) framing, and the second one of the plurality of antenna modules to communicate second data with the second station via a second radio of the plurality of radios and utilizing a second OFDMA framing, and
wherein the first data and the second data are independent and unique from each other, the first OFDMA framing and the second OFDMA framing are independent from each other, and the first radio and the second radio are independent and unique from each other.

2. The system of claim 1, the dynamic configuration unit to determine resource requirements corresponding to the first and second usages.

3. The system of claim 2, the dynamic configuration unit to determine the first one of the antenna modules based at least in part on the resource requirement corresponding to the first usage, and determine the second one of the antenna modules based at least in part on the resource requirement corresponding to the second usage.

4. The system of claim 1, the first antenna beam associated with the first antenna module being shared between a first mobile device and a second mobile device using time-division multiplexing or frequency-division multiplexing.

5. The system of claim 1, the dynamic configuration unit to receive an indication of a third usage for a third and a fourth one of the plurality of antenna modules and the main beamforming unit to generate signal adjustments relative to the third and fourth one of the plurality of antenna modules such that antenna beams associated with the third and the fourth one of the plurality of antenna modules is generated based at least in part on the third usage.

6. The system of claim 5, wherein the antenna beams associated with the third and the fourth one of the plurality of antenna modules are independently steerable antenna beams and are each aimed at a single mobile device to increase spatial diversity to overcome multipath interference or fading.

7. The system of claim 1, the dynamic configuration unit to receive an indication of a third usage and a fourth usage for a third one of the plurality of antenna modules and the main beamforming unit to generate signal adjustments relative to the third one of the plurality of antenna modules such that a third antenna beam associated with the third one of the plurality of antenna modules is generated based at least in part on the third usage and the fourth usage.

8. The system of claim 1, further comprising a usage monitoring unit comprising circuitry to receive indications of a feedback corresponding to the first usage, the main beamforming unit to generate updated signal adjustments relative to the first one of the plurality of antenna modules to control the antenna beam associated with the first one of the plurality of antenna modules based at least in part on the feedback.

9. The system of claim 1, the dynamic configuration unit to power off one or more of the plurality of antenna modules based on the first usage.

10. The system of claim 1, wherein the signal adjustments include signal magnitude adjustments and signal phase adjustments.

11. The system of claim 1, wherein at least one of the main beamforming unit, the dynamic configuration unit, and a usage monitoring unit are at least one of a baseband processor, an intermediate frequency processor, and an RF processor.

12. The system of claim 1, wherein the RF beamforming circuits are Radio Frequency Integrated Circuits (RFICs) and the antenna modules are configured to operate in a millimeter wave frequency range.

13. A method implemented in a modular antenna array system comprising:
receiving an indication of a first usage for a first modular antenna array including a plurality of antenna modules, each of the antenna modules coupled with one of a plurality of radios and comprising an array of antenna elements coupled to one of a plurality of radio frequency (RF) beamforming circuits, the plurality of RF beamforming circuits to adjust phase shifts associated with the antenna elements to generate antenna beams associated with antenna modules;
receiving another indication of a second usage for a second one of the plurality of antenna modules;
determining a one of the antenna modules of the plurality of antenna modules to support the first usage, and a second one of the antenna modules to support the second usage;
generating signal adjustments relative to the one of the plurality of antenna modules to control first antenna beam associated with the one of the plurality of antenna modules based at least in part on the first usage, and signal adjustments relative to the second one of the antenna modules to support the second usage, wherein the first usage and the second usage correspond to a first station and a second station, respectively;
causing communication, via the first one of the plurality of antenna modules and a first radio of the plurality of radios, of first data with the first station utilizing a first orthogonal frequency division multiple access (OFDMA) framing; and causing communication, via the second one of the plurality of antenna modules and a second radio of the plurality of radios, of second data with the second station utilizing a second OFDMA framing, wherein the first data and the second data are independent and unique from each other.

14. The method of claim 13, determining resource requirements associated with the first and second usages, the determining the one and the second one of the antenna modules to support the usage based at least in part on the resource requirements.

15. The method of claim 13, comprising:
receiving third indication of a third usage for the modular antenna array;
determining a third and a fourth one of the plurality of antenna modules to support the third usage; and
generating signal adjustments relative to the third and the fourth one of the plurality of antenna modules such that antenna beams associated with the third and the fourth one of the plurality of antenna modules is generated based at least in part on the third usage.

16. The method of claim 15, wherein the antenna beams associated with the third and the fourth one of the plurality of antenna modules are independently steerable antenna beams and are each aimed as a single mobile device to increase spatial diversity to overcome multipath interference or fading.

17. The method of claim 15, wherein the antenna beams associated with the third and the fourth one of the plurality of antenna modules combine to form a composite antenna beam to increase directivity of the antenna beams.

18. The method of claim 13, comprising:
receiving an indication of a third usage and a fourth usage for the modular antenna array;
determining a third one of the plurality of antenna modules to support the third usage and the fourth usage; and
generating signal adjustments relative to the third one of the plurality of antenna modules such that an antenna beam associated with the third one of the plurality of antenna modules is generated based at least in part on the third usage and the fourth usage.

19. The method of claim 13, comprising:
receiving indications of a feedback corresponding to the first usage; and
generating updated signal adjustments relative to the first one of the plurality of antenna modules to control the antenna beam associated with the first one of the plurality of antenna modules based at least in part on the feedback.

20. At least one non-transitory machine readable medium comprising a plurality of instructions that in response to be executed on a baseband processing module in a modular antenna array system cause the baseband processing module to:
receive an indication of a first usage and a second usage for a modular antenna array including a plurality of antenna modules, each of the antenna modules coupled with one of a plurality of radios and comprising an array of antenna elements coupled to one of a plurality of radio frequency (RF) beamforming circuits, the RF beamforming circuits to adjust phase shifts associated with the antenna elements to generate antenna beams associated with the antenna modules;
determine a first one of the antenna modules of the plurality of antenna modules to support the first usage;
determine a second one of the antenna modules of the plurality of antenna modules to support the second usage;
generate signal adjustments relative to the first antenna module to control a first antenna beam associated with the first antenna module based at least in part on the first usage;
generate signal adjustments relative to the second antenna module to control a second antenna beam associated with the second antenna module based at least in part on the second usage, wherein the first usage and the second usage correspond to a first station and a second station, respectively;
cause communication, via the first one of the plurality of antenna modules and a first radio of the plurality of radios, of first data with the first station utilizing a first orthogonal frequency division multiple access (OFDMA) framing; and
cause communication, via the second one of the plurality of antenna modules and a second radio of the plurality of radios, of second data with the second station utilizing a second OFDMA framing, wherein the first data and the second data are independent and unique from each other.

21. The at least one non-transitory machine readable medium of claim 20, the baseband processing module to determine resource requirements associated with the first and the second usages, wherein determining the first antenna module of the plurality of antenna modules to support the first usage based at least in part on the resource requirements, and wherein determining the second antenna module to support the second usages based at least in part on the resource requirements.

22. The at least one non-transitory machine readable medium of claim 20, the baseband processing module to power off a third one of the antenna modules based on the first usage and the second usage.

* * * * *

UNITED STATES PATENT AND TRADEMARK OFFICE
CERTIFICATE OF CORRECTION

PATENT NO. : 10,396,885 B2
APPLICATION NO. : 15/021581
DATED : August 27, 2019
INVENTOR(S) : Richard B. Nicholls et al.

Page 1 of 1

It is certified that error appears in the above-identified patent and that said Letters Patent is hereby corrected as shown below:

In the Claims

Column 20, Line 27, replace "cause communication" with -- causing communication --.

Column 20, Line 32, replace "cause communication" with -- causing communication --.

Signed and Sealed this
Twenty-ninth Day of December, 2020

Andrei Iancu
*Director of the United States Patent and Trademark Office*